G. BURICH.
VALVE FOR WATER SUPPLY PIPES.
APPLICATION FILED MAY 2, 1917.
1,244,833.
Patented Oct. 30, 1917.
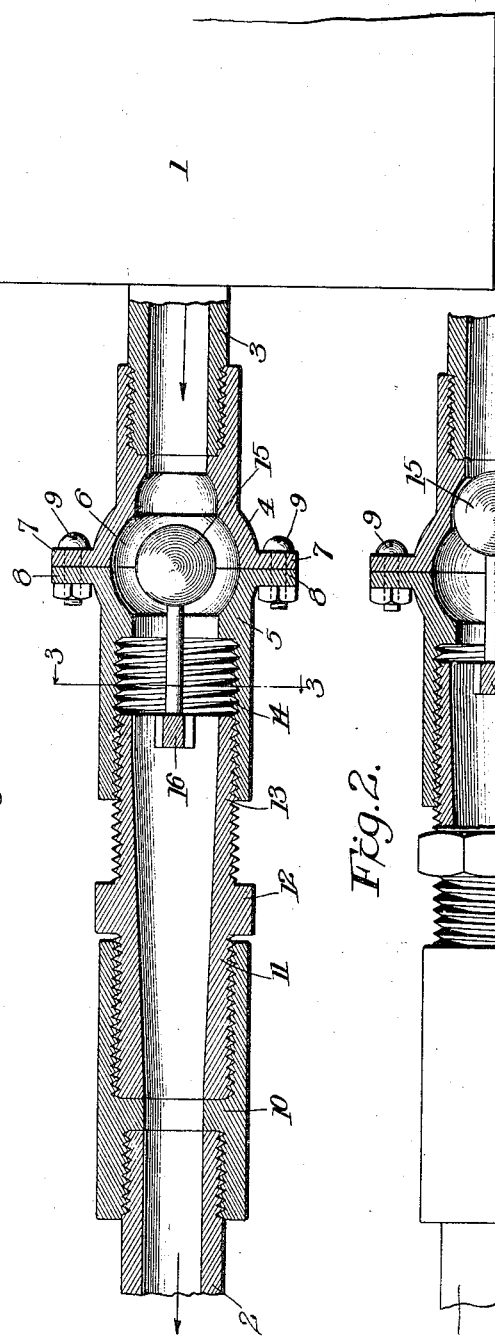
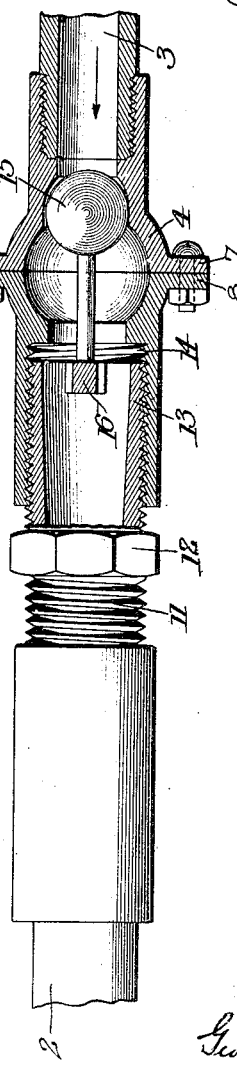
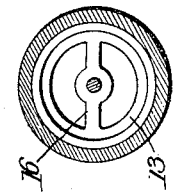
Inventor
George Burich
By Foster Freeman Watson & Cort
Attorney
Witness
G. S. Baker

UNITED STATES PATENT OFFICE.

GEORGE BURICH, OF SAN FRANCISCO, CALIFORNIA.

VALVE FOR WATER-SUPPLY PIPES.

1,244,833.  Specification of Letters Patent.  Patented Oct. 30, 1917.

Application filed May 2, 1917. Serial No. 165,979.

*To all whom it may concern:*

Be it known that I, GEORGE BURICH, a citizen of the United States, and resident of San Francisco, San Francisco county, State of California, have invented certain new and useful Improvements in Valves for Water-Supply Pipes, of which the following is a specification.

The present invention relates to improvements in means for controlling and regulating the supply of water to household service pipes. The particular object of the invention is to provide a simple and readily adjustable means in the connection between the water meter and the house service main which will prevent racing or jumping of the registering dial or indicator in case two or more outlets are simultaneously opened. By the invention a simple and inexpensive means is provided for readily controlling the flow of water through the connection between the meter and the house service pipe whereby accurate recording of the amount of water actually withdrawn through said main will be insured. By use of the invention a saving to the individual water user is effected and thereby the public largely benefited.

In the accompanying drawings,

Figure 1 is a sectional view through a valve mechanism constructed in accordance with the invention;

Fig. 2 is a similar view showing the valve in a different adjusted relation to the supply conduit;

Fig. 3 is a transverse section on the line 3—3 of Fig. 1; and

Fig. 4 illustrates a slight modification.

Referring to the drawing, 1 illustrates conventionally a meter from which leads a suitable supply conduit and 2 designates a delivery pipe or part of a house service main. The supply conduit, in the embodiment of the invention illustrated comprises a section 3 shown as connected with the casing of the meter 1, and two sections 4, 5 which are so shaped as to provide an enlarged chamber 6. The said sections 4, 5 are shown as provided at their adjacent ends with lugs or flanges 7, 8 and bolts 9 are employed to securely connect said sections so that a fluid-tight joint is provided between them. As shown, the conduit section 4 is engaged by a suitable thread with the section 3 although it is obvious that if desired said sections may be formed integral. The delivery pipe 2 is provided in the embodiment of the invention illustrated with an extension 10 having at one end an interiorly threaded socket adapted to receive the exteriorly threaded section 11 of a connecting member which comprises a body 12 and threaded end sections 11, 13. The section 11 is, as above described, screwed within the socket at the outer end of the delivery pipe 2 and the section 13 of the coupling member is similarly engaged with an interiorly threaded socket 14 in the supply conduit section 5. The coupling or connecting member is of such length that it does not extend completely throughout the length or depth of the two sockets in the supply and delivery pipes and is adapted to be moved longitudinally in said sockets and in relation to both said conduits by being rotated. To enable such coupling or connecting member to be readily turned the body 12 thereof is made polygonal in cross section and as shown projects slightly beyond the peripheries of the two conduits.

A valve 15 carried by a cross bar or web 16 adjacent the end of the threaded member 13 of the coupling or connecting member is adapted to coöperate with a suitable seat formed at the side of the enlarged chamber 6 adjacent the meter to control the flow of fluid through the conduit. As shown in Figs. 1 and 2 the valve is of spherical form.

It will be seen that by turning the coupling or connecting member the valve may be readily adjusted from the position shown in Fig. 1 to that shown in Fig. 2, for example, or into any other desired relation to the valve seat so as to vary the size of the passage and control the amount of fluid permitted to pass to the delivery conduit 2. In all adjusted positions of the parts fluid-tight joints between the several members are provided.

In the embodiment of the invention illustrated in Fig. 4 a slightly different form of valve is employed. In this form the valve comprises a semi-spherical body 15ª having a washer 17 secured to the outer face thereof and adapted to coöperate with the seat 18. The washer 17 may be dispensed with and the body of the valve caused to coöperate directly with the seat.

It is believed that the manner of using and advantages of the improvements will be understood from the foregoing description taken in connection with the drawing.

Having thus described the invention what is claimed and desired to be secured by Letters Patent is:

1. In a means for controlling the flow of fluid from a meter, the combination of a supply pipe, a delivery pipe, a coupling having threaded end sections, directly engaging corresponding sections of said pipes, and an intermediate body by which it may be rotated and thereby adjusted longitudinally relative to both of said pipes, independent of any relative movement between said pipes, and a valve carried by and bodily movable with said coupling for controlling the flow of fluid through the pipes.

2. The combination of a fluid supply pipe, a delivery pipe, one of said pipes being provided with an enlarged valve chamber and a valve seat at one side of said chamber, a coupling having threaded end sections, directly engaging the supply and delivery pipes, and an intermediate body by which it may be turned, and a valve supported by the coupling and extending into said valve chamber, the valve being adjusted relative to the valve seat in said chamber, independent of any relative movement between the supply and delivery pipes, by turning the coupling.

In testimony whereof I affix my signature.

GEORGE BURICH.

Witnesses:
A. K. DAGGETT,
G. B. DUFFY.

Copies of this patent may be obtained for five cents each, by addressing the "Commissioner of Patents, Washington, D. C."